United States Patent [19]

Smale

[11] Patent Number: 5,662,001

[45] Date of Patent: Sep. 2, 1997

[54] MANUAL SHIFTER AND IGNITION INTERLOCK

[75] Inventor: Randall D. Smale, Farmington Hills, Mich.

[73] Assignee: Dura Automotive Services, Rochester Hills, Mich.

[21] Appl. No.: 629,083

[22] Filed: Apr. 8, 1996

[51] Int. Cl.$^6$ ..................................................... G05G 11/00
[52] U.S. Cl. .......................... 74/483 R; 74/477; 477/99; 70/247
[58] Field of Search ................ 477/99; 74/480 R, 74/483 R, 477; 70/245, 246, 247, 248

[56] References Cited

U.S. PATENT DOCUMENTS

| | | |
|---|---|---|
| 1,225,135 | 5/1917 | Josephson . |
| 2,789,667 | 4/1957 | Tannenbaum et al. . |
| 4,524,635 | 6/1985 | Hulin et al. . |
| 4,693,135 | 9/1987 | LaRocca et al. . |
| 4,926,688 | 5/1990 | Murasaki ........................... 477/99 X |
| 4,938,042 | 7/1990 | Muramatsu ........................ 70/245 |
| 5,003,799 | 4/1991 | Imai et al. ......................... 70/247 |
| 5,150,593 | 9/1992 | Kobayashi et al. ............... 477/99 X |
| 5,314,049 | 5/1994 | Nordstrom . |
| 5,402,870 | 4/1995 | Osborn ............................. 74/483 R |
| 5,562,568 | 10/1996 | Smale ............................... 477/99 |
| 5,566,581 | 10/1996 | Smale et al. .................... 70/248 X |

*Primary Examiner*—Charles A. Marmor
*Assistant Examiner*—Peter T. Kwon
*Attorney, Agent, or Firm*—David A. Greenlee

[57] ABSTRACT

A manual transmission shifter and ignition interlock is provided for a vehicle having a manual transmission operated by a shift lever (20). A bi-stable solenoid (86) is movable between positions blocking and unblocking movement of the vehicle ignition (78) to OFF. Another bi-stable solenoid (66) has an output arm (68) which operates a control linkage (54) and raise and lower a locking lever (48) to engage and disengage the locking level from a locking probe (34) on the shift lever to lock and unlock shift lever (20) when in REVERSE. The solenoids (66, 86) are controlled by a controller (74) that is provided with high and low current inputs from branch circuits (90, 92) that include control switches (94, 96) operated by ignition position. The controller (74) causes solenoid (66) to extend the control linkage (54) when the shift lever (20) is moved to REVERSE, and the ignition (78) is moved to ACCESSORY. This closes a switch (96), causing the controller (74) to retract the ignition solenoid (86) and enable movement to OFF for key removal.

7 Claims, 4 Drawing Sheets

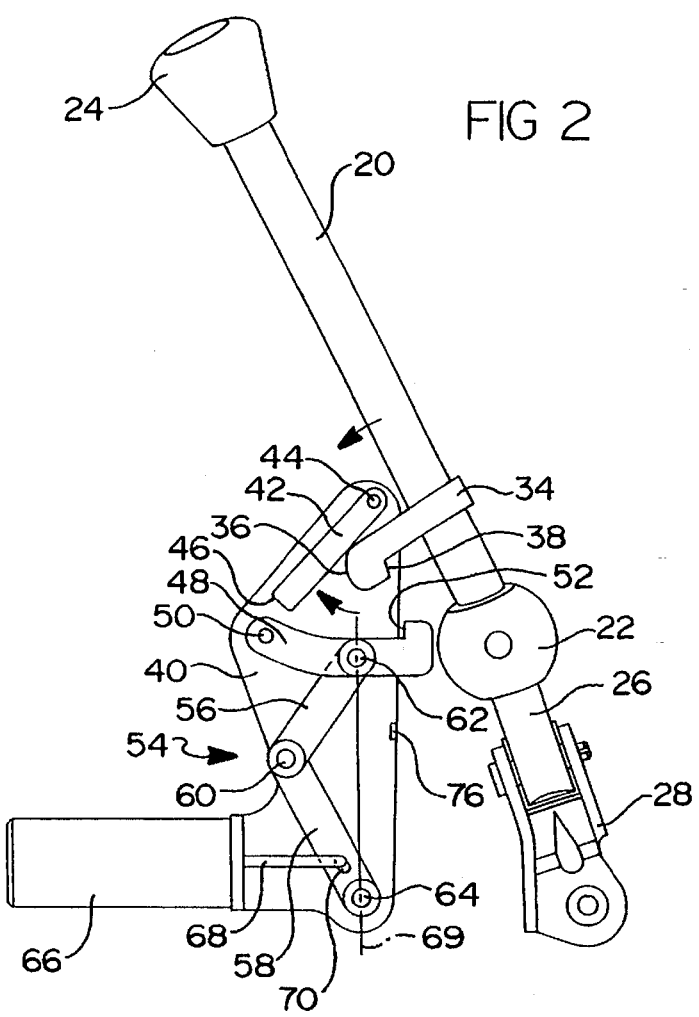
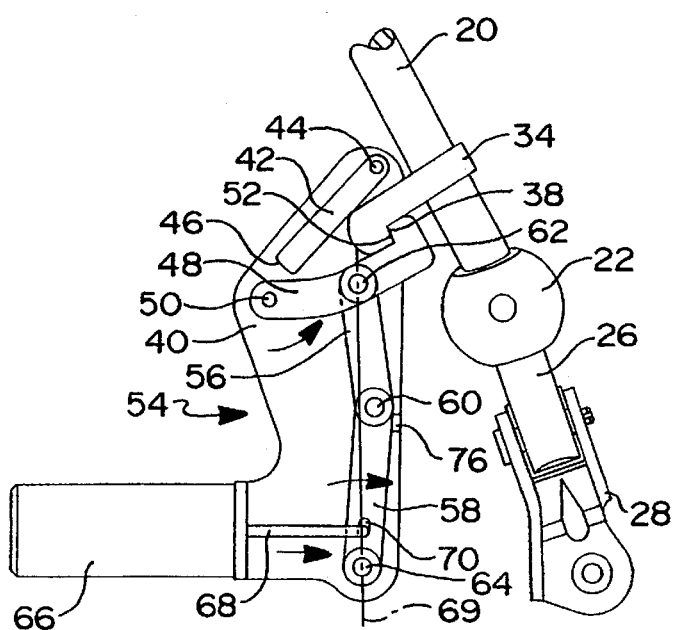

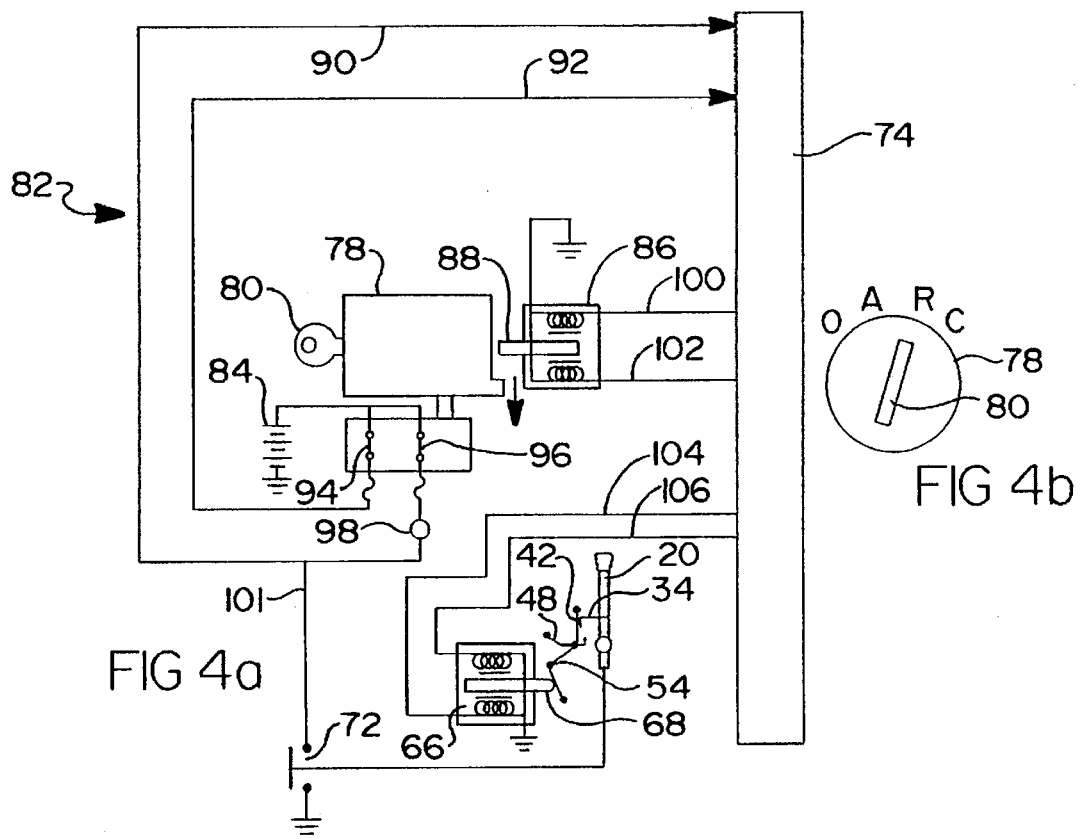
FIG 4a
FIG 4b
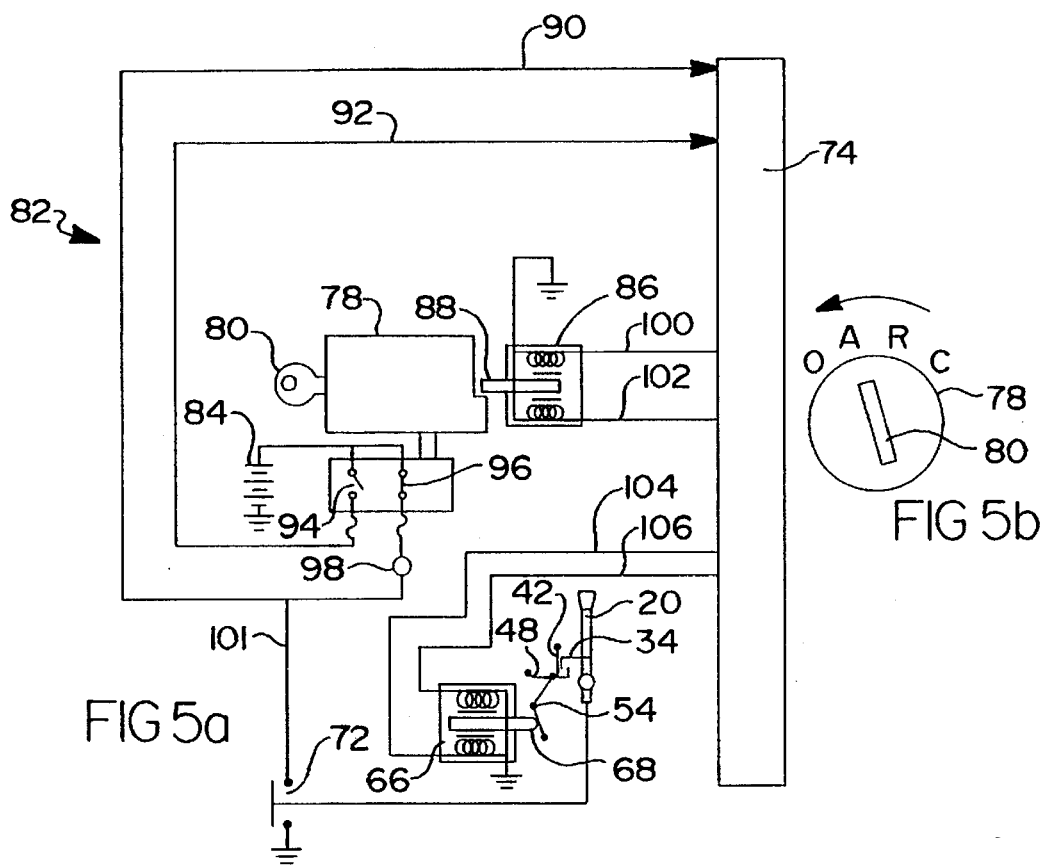
FIG 5a
FIG 5b

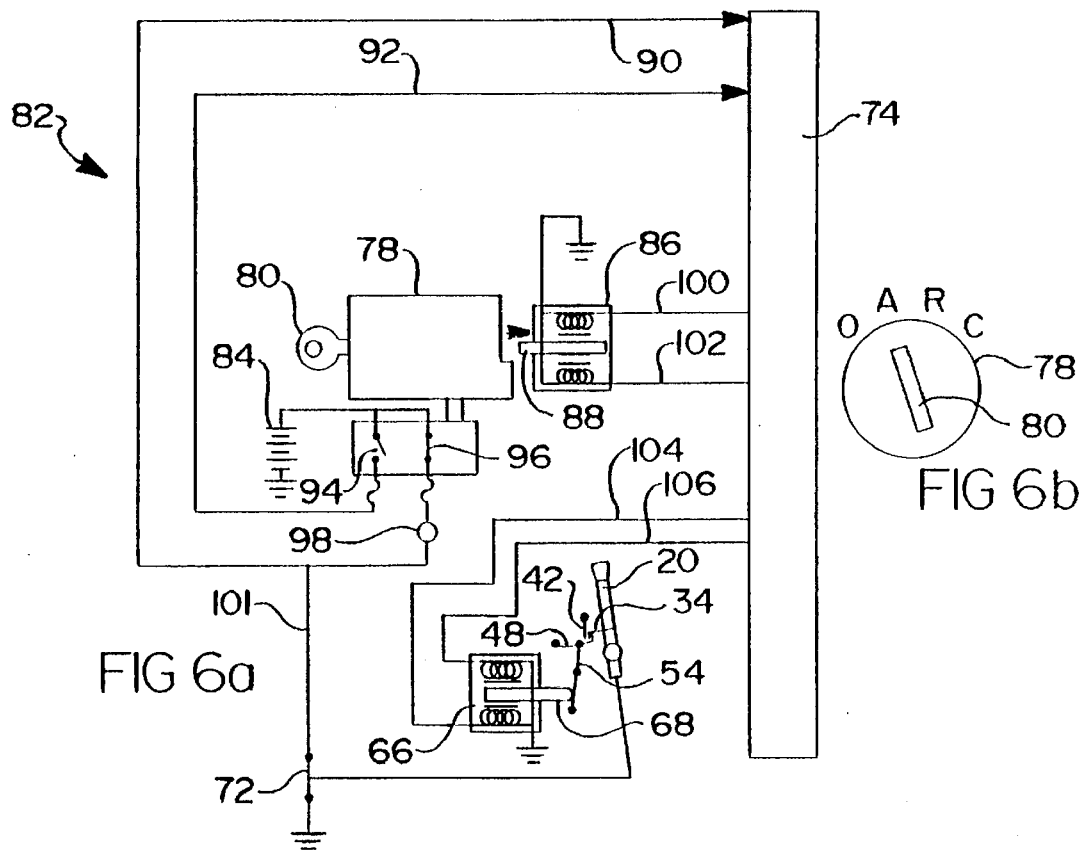
FIG 6a
FIG 6b
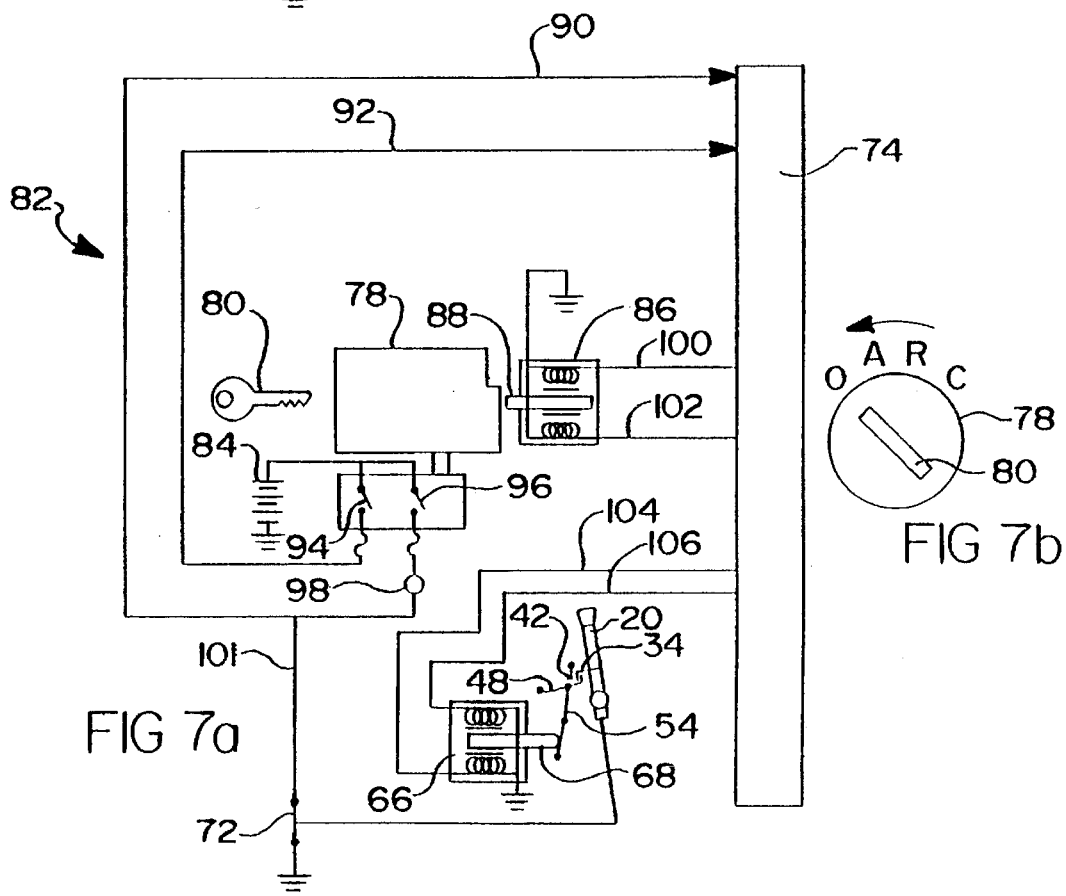
FIG 7a
FIG 7b

MANUAL SHIFTER AND IGNITION INTERLOCK

BACKGROUND OF THE INVENTION

This invention relates generally to vehicle manual transmissions and, more particularly, to a vehicle manual transmission and ignition interlock.

Many anti-theft systems have been developed for vehicles with automatic transmissions which prevent movement of the transmission out of PARK when the vehicle ignition is switched to OFF and the ignition key is removed. All of these systems are designed to prevent forward vehicle motion.

Since a manual transmission has no transmission position equivalent to PARK, such an anti-theft system has previously not been developed for manual transmission vehicles. However, unless the vehicle parking brake is engaged, the manual transmission shift lever can be moved to NEUTRAL or to a forward gear to enable forward motion of the vehicle.

It would be desirable to provide a manual transmission and ignition interlock system for a vehicle which prevents movement of the shifter out of REVERSE to any of the forward gears when the vehicle ignition is in the OFF position with the key removed.

SUMMARY OF THE INVENTION

It is therefore an object of this invention to provide a manual transmission and ignition interlock system for a vehicle which prevents movement of the shifter out of REVERSE to any of the forward gears when the vehicle ignition is in the OFF position with the key removed.

In one aspect, this invention features a shift lever lock for a vehicle having a manual transmission which is controlled by a shift lever movable between a plurality of operating positions including REVERSE comprising a first locking member mounted on the vehicle for movement between locking and unlocking positions, a second locking member mounted on the shift lever for engagement with the first locking member when in locking position upon shift lever movement to REVERSE to lock the shift lever against movement out of REVERSE. A lock blocking member is mounted on the vehicle for movement between positions blocking and enabling movement of the first locking member to locking position and unblocking means are carried by the shift lever for moving the lock blocking member to unblocking position when the shift lever is moved to REVERSE. Control means are responsive to movement of the ignition to a non-RUN position to move the first locking member to locking position when the shift lever is in REVERSE.

Preferably, the shift lever lock includes an ignition blocking device having a position normally blocking movement of the ignition to OFF, and the control means include means responsive to movement of the first locking member to locking position to move the ignition blocking device out of blocking position to enable movement of the ignition to OFF. An overcenter control linkage is connected to the first locking member and is mounted on the vehicle lever for overcenter movement between an extended condition locating the first locking member in locking position and a retracted condition locating the first locking member in unlocking position. A stop is mounted on the vehicle for limiting movement of the overcenter linkage beyond the extended condition.

In another aspect of this invention, the ignition blocking device is a first bi-stable solenoid movable between positions blocking and unblocking movement of the ignition to OFF, and the control means include a second bi-stable solenoid for moving the overcenter linkage between extended and retracted conditions. A position switch is actuated by movement of the shift lever to REVERSE, and an electrical circuit interconnects the solenoids, the control means, the position switch and the ignition. The control means responds to the combined movement of the shift lever to REVERSE and movement of the ignition to ACCESSORY cause the second bi-stable solenoid to extend the overcenter linkage and move the first locking member to locking position, and to cause the first bi-stable solenoid to move to unblocking position, thereby locking the shift lever in REVERSE and enabling movement of the ignition to OFF.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 2 is a view similar to FIG. 1, with the shift lever shown moved to REVERSE;

FIG. 3 is a view similar to FIG. 2, but with the shift lever locked by movement of the shift lever lock to locking position to prevent shifter movement out of REVERSE;

FIGS. 4a and b are schematics of an ignition and an electrical control circuit for a manual shifter and ignition interlock system according to this invention, with the shift lever shown out of REVERSE, the locking member control linkage and its solenoid retracted, the ignition in RUN position, and the ignition solenoid extended to blocking position;

FIGS. 5a and b are views similar to FIGS. 4a and b, with the ignition moved to ACCESSORY position;

FIGS. 6a and b are views similar to FIGS. 5a and b, with the shifter moving the blocking member to unblock position upon movement to REVERSE, the locking member control linkage and its solenoid extended to lock the shift lever in REVERSE, as in FIG. 3, and the ignition solenoid retracted; and FIGS. 7a and b are views similar to FIGS. 6a and b, with the ignition moved to OFF, enabling key removal.

DETAILED DESCRIPTION OF PREFERRED EMBODIMENTS

Figure 1:
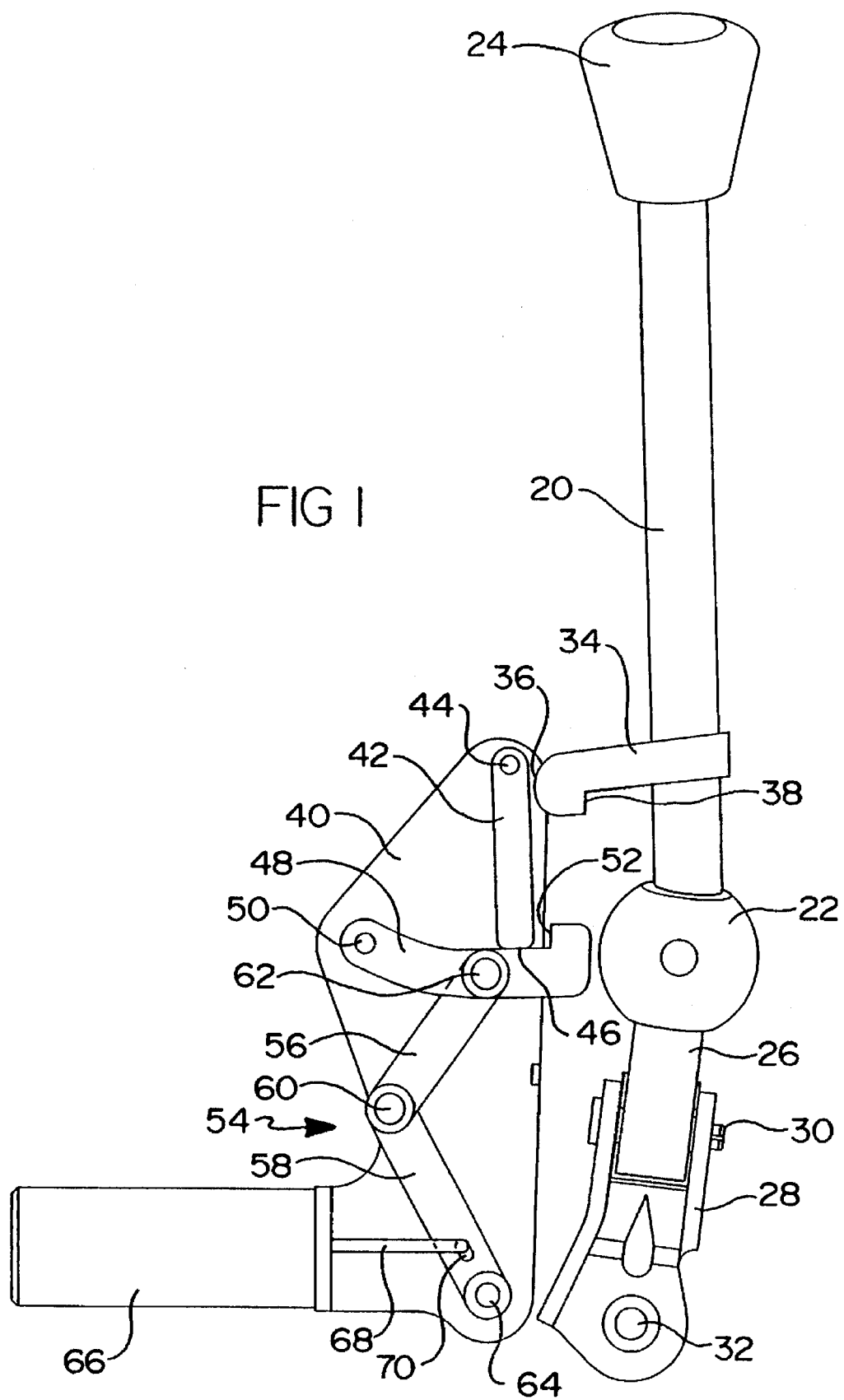
FIG. 1 is a side view of a manual transmission shifter having a shift lever and ignition interlock according to this invention, with the shifter shown out of REVERSE and the shifter lock in unlocking position.

Referring now to FIG. 1 of the drawings, a ball shifter has a shift lever 20 that is movable about a pivotal ball 22 among NEUTRAL, REVERSE and several FORWARD gear positions to operate a cable-controlled manual transmission (not shown). The construction and operation of a ball shifter of this type is fully disclosed in U.S. Pat. No. 4,693,135 to LaRocca et al.

Shift lever 20 is capped by a manual control knob 24. A shaft 26 depends from ball 22 and mounts control link 28 via pivot pin 30. Control link 28 contains an eyelet 32 for attachment to a transmission control cable (not shown). A locking member or probe 34 is mounted on and extends from shift lever 20. The distal end of probe 34 has nose 36 and a locking shoulder 38.

A shifter lock mounting bracket 40 is mounted on the vehicle and has the proximal end of a blocking member or arm 42 pivoted to it at 44. Arm 42 is biased by gravity to its FIG. 1 vertical position by gravity so that abutment 46 on its distal end engages a locking lever or member 48. The proximal end of locking lever 48 is pivoted at 50 to bracket 40, while its distal end carries a locking shoulder 52.

An overcenter control linkage 54 comprises a pair of links 56 and 58 that have their inner ends pivotally interconnected at 60. The free end of link 56 is pivoted to locking lever 48 at 62, while the free end of link 58 is pivoted at 64 to mounting bracket 40. A bi-stable solenoid 66 is mounted on bracket 40 and has an output arm 68 that operatively engages a slot 70 in link 58. In FIG. 1, shift lever 22 is illustrated in a position other than REVERSE.

In the FIG. 2 position (same as FIG. 1), control linkage 56 is in its retracted condition or position with pivot 60 lying to the left of the centerline 69 connecting pivots 62 and 64. As shift lever 20 is moved to REVERSE, nose 36 of probe 34 engages and pivots arm 42 clockwise to disengage abutment 46 from locking lever 48. This movement of shift lever 20 into REVERSE also closes a shift lever position switch 72, as will be later described with reference to FIG. 6.

Closure of key 72 (and movement of ignition switch 80 to ACCESSORY or OFF, as later described) causes a control device 74 to operate solenoid 66, as later described with reference to FIGS. 5–7, to extend output arm 68 and move link 58 clockwise about pivot 64. This forces control linkage 54 to move overcenter (i.e. moving pivot 60 across centerline 69) until link 58 engages a stop 76 on bracket 40, as shown in FIG. 3. Since blocking arm 42 has been removed out of the way, movement of control linkage 54 to its extended position raises locking lever 48. This enables its locking shoulder 52 to engage locking shoulder 38 on probe 34, locking shift lever 20 against movement out of REVERSE.

This construction provides an effective means of locking shift lever 20 in REVERSE by the use of a relatively weak solenoid 66, which need only be powerful enough to extend linkage 54 against no other force. The overcenter action of control linkage 54 assures that any force on shift lever 20, which attempts to move it out of REVERSE when locked, will only engage link 58 more tightly against stop 76 and will not be transferred to solenoid 60.

To release shift lever 20, solenoid 66 is retracted with only that force needed to slightly straighten control linkage 54 to move back overcenter and to overcome the weak friction force between interengaged locking shoulders 38 and 52. Once overcenter, the weight of links 56 and 58 and of locking lever 48 will aid in movement of control linkage 54 to the retracted position of FIG. 2. Now that it is free, shift lever 20 can be moved out of REVERSE. The removal of probe 34 allows gravity to swing blocking arm 42 to return to its blocking position, as shown in FIG. 1.

FIGS. 4–7 are a sequence of schematic illustrations of operation of the manual shifter and ignition interlock according to this invention. Shift lever 20, probe 34, blocking arm 42, locking lever 48, control linkage 54, solenoid 66, and its output arm 68 are shown, as is a vehicle ignition 78 and ignition key 80. As shown in FIGS. 4b, 5b, 6b and 7b, key 80 is inserted to operate ignition 78 which is movable among OFF (O), ACCESSORY (A), RUN (R) and CRANK (C) positions. Key 80 can only be removed in the OFF ignition position of FIG. 7b.

A control circuit 82 includes a power source 84, bi-stable solenoid 66, and control device or controller 74, which incorporates a microprocessor and is preferably a unit developed by General Motors Corporation that is termed a "PZM". Also included is another bi-stable solenoid 86 having an output arm 88 that extends to a position blocking movement of ignition to OFF, and retracts to enable such movement. As previously noted, output arm 68 of solenoid 60 locks shift lever 20 in REVERSE.

Controller 74 is supplied with "high" and "low" current inputs from lines 90 and 92 that connect through switches 94 and 96 to power source 84. Controller 74 controls operation of solenoids 66 and 86 via outputs 100, 102 and 104, 106. When controller 74 receives a "high" input from either lines 90 or 92, it controls solenoid 86 to extend output arm 88 and controls solenoid 66 to retract output arm 68. When controller 74 receives a "low" current input from both lines 90 and 92, it controls solenoid 86 to retract output arm 88 and controls solenoid 66 to extend output arm 68.

Switches 94 and 96 are operated by ignition 78. Switches 94 and 96 are both open in ignition OFF position and are both closed in RUN and CRANK positions. Switch 94 open and switch 96 is closed in ACCESSORY position. Input line 90 includes a backup light 98. A branch line 101 includes shift lever switch 72 and connects input line 90 to ground. Operation of circuit 82 will now be described with sequential reference to FIGS. 4–7.

In the vehicle running position of FIGS. 4a and b, ignition 78 is in RUN and switches 94 and 96 are closed, sending a "high" input signal to controller 74 through both input lines 90 and 92. As a result, solenoid output arm 88 is extended to block movement of ignition 78 to OFF, and solenoid output arm 68 is retracted to retract control linkage 54. Shift lever 20 can be freely moved into and out of REVERSE as the vehicle is operated without latching.

When it is desired to park and exit the vehicle, the ignition is moved to ACCESSORY, as shown in FIGS. 5a and 5b. This opens switch 94, but switch 96 remains closed.

The effect of subsequent movement of shift lever 20 to REVERSE is shown in FIGS. 6a and b. This action projects probe 34 to move blocking arm 42 to unblocking condition, as shown in FIG. 2. This movement also closes switch 72, which grounds line 101, producing a low current input to controller 74, even though switch 96 remains closed. Since controller 74 now receives low current inputs from lines 92 and 94, it controls solenoid 66 to extend output arm 68 to extend control linkage 54 and raise the unblocked locking lever 48. This engages locking shoulders 38 and 52, as shown in FIG. 3, locking shift lever 20 in REVERSE.

The low current inputs will also cause controller 74 to control solenoid 86 to retract output arm 88 to enable movement of ignition 78 to OFF, as shown in FIGS. 7a and b, enabling removal of key 164. Ignition movement to OFF or ACCESSORY opens switch 94, maintaining the low current input to controller 74 via input line 90.

When it is desired to again drive the vehicle, key 80 is reinserted and ignition 78 is moved to CRANK to start the vehicle, then to RUN, as shown in FIGS. 4a and b. This closes both switches 94 and 96, providing a high current input to controller 74, which operates solenoid 86 to extend plunger 88, blocking key removal. Controller also operates solenoid 66 to retract plunger 68, retracting control linkage 54 to lower locking lever 48 and disengaging locking surfaces 38 and 52. This frees shift lever 20 for movement out of REVERSE to transmission operating positions. The vehicle can now be operated in normal fashion.

While only a preferred embodiment has been illustrated and described, obvious modifications thereof are contemplated within the scope of this invention and the following claims.

I claim:

1. A shift lever lock for a vehicle having a manual transmission controlled by a shift lever movable between a plurality of operating positions including REVERSE and an ignition movable between RUN and non-RUN positions including OFF, comprising a first locking member mounted on the vehicle for movement between locking and unlocking positions, a second locking member mounted on the shift lever for engagement with the first locking member when in locking position upon shift lever movement to REVERSE to lock the shift lever against movement out of REVERSE, a lock blocking member mounted on the vehicle for movement between positions blocking and enabling movement of the first locking member to locking position, unblocking means carried by the shift lever for moving the lock blocking member to unblocking position when the shift lever is moved to REVERSE, and control means responsive to movement of the ignition to a non-RUN position to move the first locking member to locking position when the shift lever is in REVERSE.

2. The shift lever lock of claim 1, including an ignition blocking device having a position normally blocking movement of the ignition to OFF, and the control means include means responsive to movement of the first locking member to locking position to move the ignition blocking device out of blocking position to enable movement of the ignition to OFF.

3. The shift lever lock of claim 2, wherein the control means include a control linkage connected to the first locking member and mounted on the vehicle lever for movement between an extended condition locating the first locking member in locking position and a retracted condition locating the first locking member in unlocking position, and a stop mounted on the vehicle for limiting movement of the control linkage beyond the extended condition.

4. The shift lever lock of claim 3, wherein the ignition blocking device is a first electrical device movable between positions blocking and unblocking movement of the ignition to OFF, and the control means include
   a second electrical device for moving the overcenter linkage between extended and retracted conditions,
   a position switch actuated by movement of the shift lever to REVERSE, and
   an electrical circuit interconnecting the first and second electrical devices, the control means, the position switch and the ignition, wherein the control means responds to the combined movement of the shift lever to REVERSE and movement of the ignition to ACCESSORY to cause the second electrical device to extend the control linkage and move the first locking member to locking position, and to cause the first electrical device to move to unblocking position, thereby locking the shift lever in REVERSE and enabling movement of the ignition to OFF.

5. The manual transmission and ignition interlock of claim 4, further including first and second control switches operated by the ignition, the first control switch being closed in the RUN position and open in the ACCESSORY and OFF positions and the second control switch being closed in the RUN and ACCESSORY positions and open in the OFF position, wherein the first and second electrical devices are bi-stable solenoids, the first of which extends to blocking position and retracts to unblocking position, and the second of which extends to move the first locking member to locking position and retracts to move the first locking member to unlocking position, and wherein the control means include a controller which responds to a low input signal to retract the first solenoid and extend the second solenoid and which responds to a high input signal to extend the first solenoid and retract the second solenoid, and wherein the electrical circuit includes a first branch including the first control switch and a second branch including the second control switch, each branch connecting the power source and the controller to provide a low input signal to the controller when open and to provide a high input signal to the controller when closed, with the second branch having a leg including the position switch connecting the second branch to ground when closed to cause the second branch to provide a low input signal even if the second control switch is closed.

6. The shift lever lock of claim 5, wherein the first locking member is a lever having its proximal end pivoted to the vehicle and carrying a first locking shoulder on its distal end, the blocking member is an arm pivoted to the vehicle and having an abutment for engaging the lever to prevent movement out of unlocking position, the second locking member comprises a probe extending from the shift lever and having a second locking shoulder on its distal end engageable with the first locking shoulder to lock the shift lever in REVERSE, the blocking means comprises a nose on distal end of the probe for engaging the arm to swing it out of engagement with the first locking member.

7. The shift lever lock of claim 6, wherein the control linkage comprises a pair of pivotally interconnected links one of which has its free end pivoted to the vehicle, and the other of which has its free end pivoted to the lever intermediate its ends, the second bi-stable solenoid is operatively attached to one of the links to move the linkage overcenter between collapsed and extended positions, and the blocking arm is biased to blocking position.

* * * * *